(12) United States Patent
Ozawa et al.

(10) Patent No.: US 10,113,590 B2
(45) Date of Patent: Oct. 30, 2018

(54) BALL BEARING UNIT FOR TURBOCHARGER

(71) Applicant: MINEBEA MITSUMI Inc., Nagano (JP)

(72) Inventors: Kazuhito Ozawa, Kitasaku (JP); Yusuke Asai, Komoro (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/679,320

(22) Filed: Aug. 17, 2017

(65) Prior Publication Data

US 2018/0051750 A1     Feb. 22, 2018

(30) Foreign Application Priority Data

Aug. 19, 2016   (JP) .................................. 2016-161573

(51) Int. Cl.

| F16C 19/50 | (2006.01) |
| F16C 33/46 | (2006.01) |
| F01D 25/16 | (2006.01) |
| F16C 19/18 | (2006.01) |

(52) U.S. Cl.
CPC ........ F16C 33/4629 (2013.01); F01D 25/162 (2013.01); F16C 19/184 (2013.01); *F05D 2220/40* (2013.01); *F16C 2360/24* (2013.01)

(58) Field of Classification Search
CPC .... F16C 19/184; F16C 33/3843; F16C 33/38; F16C 33/385; F16C 33/3856; F16C 33/3887; F16C 33/60; F16C 33/6614; F16C 33/6629; F16C 33/6651; F16C 33/6681; F16C 2360/24
See application file for complete search history.

(56) References Cited

U.S. PATENT DOCUMENTS

| 2012/0281940 A1* | 11/2012 | Chriss ................... | F16C 19/184 |
| | | | 384/523 |
| 2013/0163909 A1* | 6/2013 | Sakaguchi ............ | F16C 33/416 |
| | | | 384/470 |
| 2015/0192176 A1* | 7/2015 | Schmidt .............. | F16C 33/6659 |
| | | | 384/470 |

FOREIGN PATENT DOCUMENTS

| EP | 2075479 A1 * | 7/2009 | .......... F16C 33/6681 |
| JP | 10227314 A * | 8/1998 | .......... F16C 33/3887 |
| JP | 2003-049830 A | 2/2003 | |
| JP | 2008133894 A * | 6/2008 | .......... F16C 33/6681 |

\* cited by examiner

*Primary Examiner* — Phillip A Johnson
(74) *Attorney, Agent, or Firm* — Pearne & Gordon LLP

(57) ABSTRACT

A ball bearing unit for a turbocharger according to an embodiment includes: an outer ring, a first inner ring, a second inner ring, a first machined retainer and a second machined retainer. The outer ring has an inner peripheral surface provided with an outer ring raceway surface at one end side and an outer ring raceway surface at another end side. At least one of the first machined retainer and the second machined retainer includes a plurality of pockets that hold the plurality of balls in a rollable manner in a circumferential direction. Each of the pockets has a diameter of equal to or more than 1.03 times and equal to or less than 1.07 times of a diameter of the balls.

4 Claims, 6 Drawing Sheets

| POCKET DIAMETER/<br>BALL DIAMETER | 1.01 | 1.02 | 1.03 | 1.04 | 1.07 | 1.09 | 1.12 | 1.15 |
|---|---|---|---|---|---|---|---|---|
| NOISE LEVEL [VRMS] | 0.6 | 0.7 | 0.8 | 0.9 | 0.9 | 1.5 | 2.8 | 4.5 |

| POCKET DIAMETER/ BALL DIAMETER | 1.01 | 1.02 | 1.03 | 1.04 | 1.07 | 1.09 | 1.12 | 1.15 |
|---|---|---|---|---|---|---|---|---|
| Fmax [N] | 620 | 330 | 270 | 220 | 130 | 122 | 115 | 110 |

POCKET DIAMETER/BALL DIAMETER

BALL BEARING UNIT FOR TURBOCHARGER

CROSS-REFERENCE TO RELATED APPLICATION(S)

The present application claims priority to and incorporates by reference the entire contents of Japanese Patent Application No. 2016-161573 filed in Japan on Aug. 19, 2016.

BACKGROUND OF THE INVENTION

1. Field of the Invention

The present invention relates to a ball bearing unit for a turbocharger that supports a rotation shaft of the turbocharger.

2. Description of the Related Art

In a ball bearing unit for a turbocharger, a rotation shaft rotates at a low speed during the process in which the rotation shaft decelerates from high speed rotation to stop. In such a circumstance, rolling elements vibrate in the pockets of the retainer, and the so-called rattling noise is generated. The rattling noise is generated when the rotation shaft is rotated at a low speed, due to the collision between the inner peripheral surface of the pockets of the retainer and the rolling elements. In a bearing device for a spindle motor in a hard disk drive device, for example, a method of reducing the noise and vibration that are generated with increased rotation speed has been known. In this method, gaps between the pockets and the rolling elements are reduced by limiting a ratio Dp/Dw between a pocket diameter (Dp) and a ball diameter (Dw) of a crown-type retainer (for example, Japanese Laid-open Patent Publication No. 2003-49830).

The crown-type retainer is used in the conventional method described above. Consequently, lubricant can enter the retainer from an opening side of the pockets, even if the gap between the pockets and the rolling elements is reduced. However, in a machined retainer used for a ball bearing for a turbocharger, areas around the pockets are not opened as that of the crown-type retainer. The machined retainer in the ball bearing for a turbocharger is an annular member with circular holes. The circular holes are opened (perforated) in the radial direction and disposed in the circumferential direction for serving as pockets to hold the rolling elements. Thus, when the gap between the pockets and the rolling elements is small, lubricant is prevented from entering the gap, thereby deteriorating the lubrication characteristics.

A groove is formed on a part of the inner peripheral surface of the pocket, along the radial direction of the machined retainer.

SUMMARY OF THE INVENTION

It is an object of the present invention to at least partially solve the problems in the conventional technology.

A ball bearing unit for a turbocharger according to an embodiment includes: an outer ring, a first inner ring, a second inner ring, a first machined retainer and a second machined retainer. The outer ring has a cylindrical shape, and has an inner peripheral surface provided with an outer ring raceway surface at one end side and an outer ring raceway surface at another end side formed separately from each other in an axial direction. The first inner ring has a first inner ring raceway surface facing the outer ring raceway surface at the one end side. The second inner ring has a second inner ring raceway surface facing the outer ring raceway surface at the another end side. The first machined retainer holds a plurality of balls disposed between the outer ring raceway surface at the one end side and the first inner ring raceway surface. The second machined retainer holds a plurality of balls disposed between the outer ring raceway surface at the other end side and the second inner ring raceway surface. At least one of the first machined retainer and the second machined retainer includes a plurality of pockets that hold the plurality of balls in a rollable manner in a circumferential direction. Each of the pockets has a diameter of equal to or more than 1.03 times and equal to or less than 1.07 times of a diameter of a ball among the plurality of balls.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a ball bearing unit for a turbocharger and the turbocharger according to an embodiment will be described in detail with reference to the accompanying drawings.

Embodiment

Figure 1:
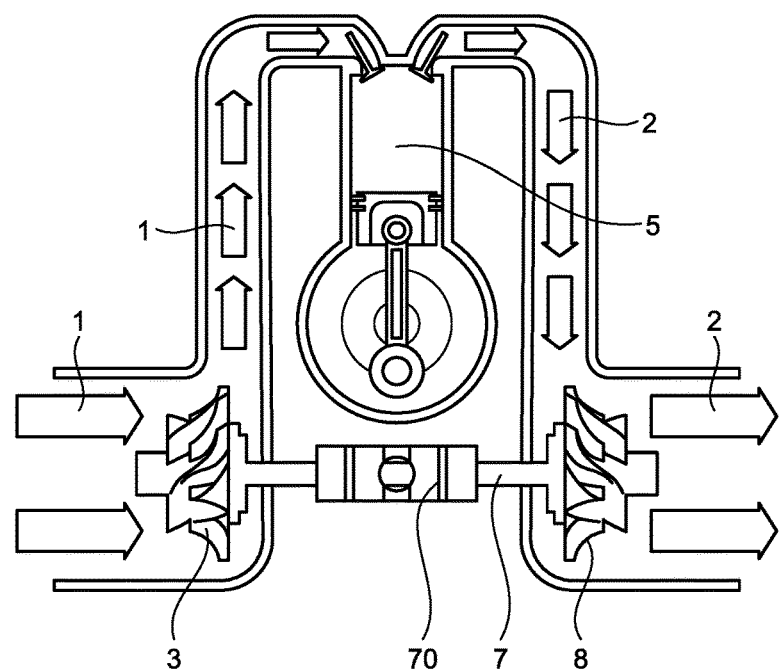
FIG. 1 is a diagram illustrating an overview of a turbocharger for a vehicle provided with a ball bearing unit for a turbocharger according to an embodiment.

FIG. 1 is a diagram illustrating an overview of a general turbocharger for a vehicle provided with a ball rolling bearing unit for a turbocharger. In FIG. 1, arrows 1 indicate the flow of the air entering the turbocharger from the outside. In FIG. 1, the right end of a rotation shaft 7 is provided with a turbine 8 that is rotated at a high speed by exhaust gas discharged from a cylinder 5 of an engine that is indicated by arrows 2. In FIG. 1, the left end of the rotation shaft 7 is provided with a compressor 3. The arrows 2 indicate the flow of exhaust gas discharged from the cylinder 5 after combustion. A ball bearing unit 70 for the turbocharger is a ball rolling bearing unit for a turbocharger that rotatably supports the rotation shaft 7. In FIG. 1, illustration of a housing that supports the ball bearing unit 70 for the turbocharger is omitted.

The turbocharger compresses the air flowing into the turbocharger and improves the combustion efficiency of the engine. As illustrated by the arrows 2, the blade of the turbine 8 rotates at a high speed due to the exhaust gas discharged from the cylinder 5 of the engine. The rotation of the turbine 8 rotates the compressor 3 that is coaxial to the turbine 8 at the same rotation speed, via the rotation shaft 7. As illustrated by the arrows 1, the air that has flowed into the turbocharger is compressed by the compressor 3, and sent to the cylinder 5 of the engine with an increased density. Consequently, an air discharge amount per unit time is increased, thereby increasing the combustion efficiency.

Figure 2:
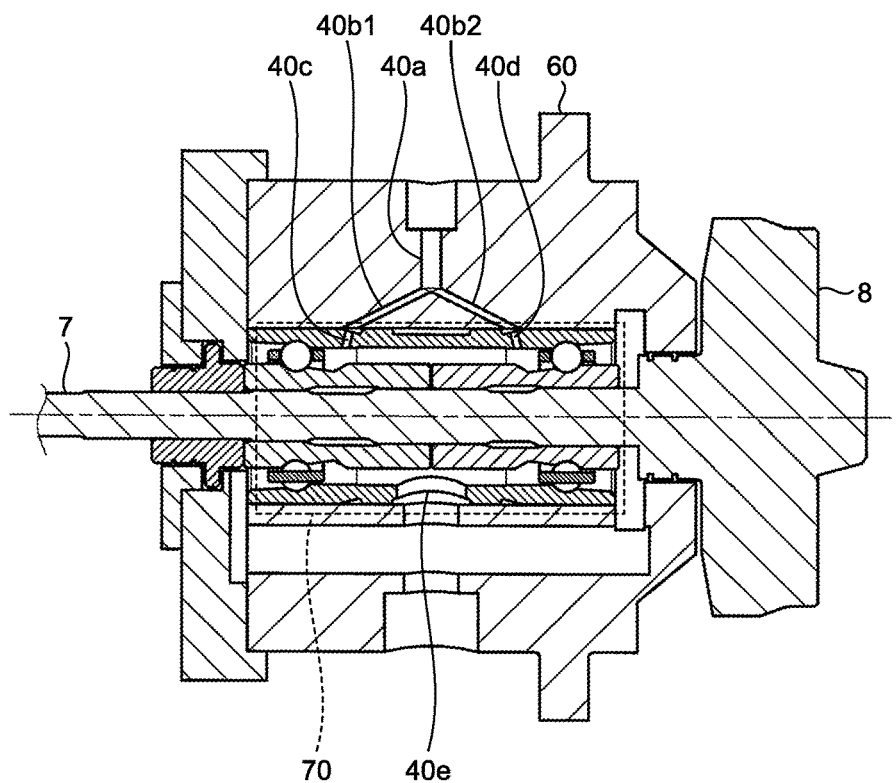
FIG. 2 is a diagram illustrating an overview when the ball bearing unit for the turbocharger according to the embodiment is incorporated into a housing.

FIG. 2 is a diagram illustrating an overview when the ball bearing unit for the turbocharger according to the embodiment is incorporated into a housing. A housing 60 has a through hole and supports the ball bearing unit 70 for the turbocharger that is inserted into the through hole. Details of the ball bearing unit 70 for the turbocharger will be described in FIG. 3. The rotation shaft 7 is a rotation shaft rotatably supported by the ball bearing unit 70 for the turbocharger. The turbine 8 is a blade fixed to the rotation shaft 7. The turbine 8 is disposed on the end of the rotation shaft 7 at the side (air discharge side) from which gas that has passed through the cylinder 5 and that is combusted is discharged. Although not illustrated in FIG. 2, the compressor 3 that rotates at the air intake side into which air flows is provided at the left end of the rotation shaft 7 in FIG. 2.

A lubricant inlet port 40a is an inlet port for lubricant filling the ball bearing unit 70 for the turbocharger. The lubricant that fills the ball bearing unit 70 for the turbocharger flows into the ball bearing unit 70 for the turbocharger from the lubricant inlet port 40a of the housing 60, and is branched to paths 40b1 and 40b2. The lubricant that passes through the path 40b1 flows into the ball bearing unit 70 for the turbocharger from a lubricant inlet hole 40c that is provided on the ball bearing unit 70 for the turbocharger, and flows out from a lubricant outlet port 40e. The lubricant that passes through the path 40b2 flows into the ball bearing unit 70 for the turbocharger from a lubricant inlet hole 40d that is provided on the ball bearing unit 70 for the turbocharger, and flows out from the lubricant outlet port 40e. For example, the lubricant outlet port 40e is provided on the outer peripheral surface of an outer ring of the ball bearing unit 70 for the turbocharger, and opposite from the lubricant inlet holes 40c and 40d. In this example, the lubricant is oil or grease, for example. The lubricant is used to reduce friction and abrasion of the ball bearing unit for the turbocharger, cool the ball bearing unit for the turbocharger by discharging heat, prevent foreign matters from entering the ball bearing unit for the turbocharger, and the like. For example, mineral oil such as spindle oil machine oil, and turbine oil is commonly used as the lubricant for the rolling bearing. However, when operational conditions are such that temperature is increased to 150 degrees Celsius or more, or reduced to minus 30 degrees Celsius or less, synthetic oil such as diester oil, silicone oil, fluorocarbon oil may also be used.

Figure 3:
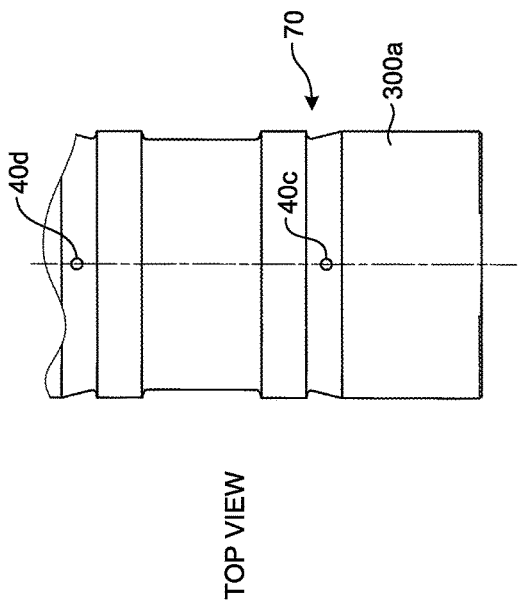
FIG. 3 is a three-view drawing illustrating the details of the ball bearing unit for the turbocharger according to the embodiment.
Figure 3:
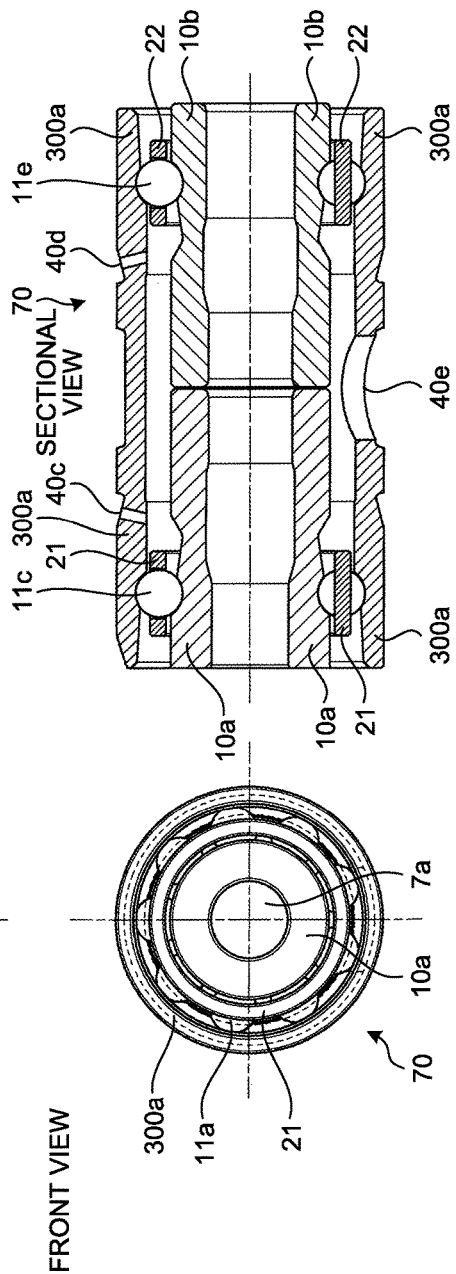

Next, the configuration of the ball bearing unit 70 for the turbocharger will be described in more detail with reference to FIG. 3. FIG. 3 is a three-view drawing illustrating the details of the ball bearing unit 70 for the turbocharger according to the embodiment. The lower left view in FIG. 3 is a front view of the ball bearing unit 70 for the turbocharger. The upper left view in FIG. 3 is a top view of the ball bearing unit 70 for the turbocharger. The lower right view in FIG. 3 is a sectional view of the ball bearing unit 70 for the turbocharger.

The lubricant inlet holes 40c, 40d and the lubricant outlet port 40e in FIG. 3 correspond to the lubricant inlet holes 40c, 40d and the lubricant outlet port 40e in FIG. 2, respectively. For example, the lubricant such as oil that has flowed into the ball bearing unit 70 for the turbocharger from the lubricant inlet hole 40c passes between an inner ring 10a and an outer ring 300a, which will be described below, and is discharged from the lubricant outlet port 40e. The lubricant is used to reduce friction, cool the ball bearing unit 70 for the turbocharger, and the like.

In the sectional view, a shaft insertion part 7a is a portion where the rotation shaft 7 (shaft) is inserted, and is a through hole that extends from one end side to the other end side of the ball bearing unit 70 for the turbocharger so that the shaft can be inserted.

The inner ring 10a and an inner ring 10b are the inner rings of the ball bearing unit 70 for the turbocharger, and each have an inner raceway surface on the outer peripheral surface. The inner ring 10a and the inner ring 10b are fixed to the rotation shaft 7 (shaft) that is inserted into the shaft insertion part 7a, and rotate with the rotation of the rotation shaft 7. The inner ring 10a and the inner ring 10b both have a hollow cylindrical shape.

The outer ring 300a is the outer ring of the ball bearing unit 70 for the turbocharger. The outer ring 300a is fitted to the housing 60, and is supported by the housing 60. The outer ring 300a is a single cylindrical member having an outer peripheral surface and an inner peripheral surface. The outer ring 300a has outer ring raceway surfaces that are separately disposed on one end side and the other end side of the inner peripheral surface in the axial direction. The outer ring raceway surfaces face the two inner ring raceway surfaces described above to form a double row raceway. The outer ring raceway surface at the one end side of the outer ring 300a is facing an inner ring raceway surface (first inner ring raceway surface) of the inner ring 10a that is a first inner ring. The outer ring raceway surface at the other end side of the outer ring 300a is facing an inner ring raceway surface (second inner ring raceway surface) of the inner ring 10b that is a second inner ring.

Balls 11c are disposed in the raceway at one end side provided between the inner ring 10a and the outer ring 300a. Thus, the balls 11c comes into point contact with the raceway surfaces of the inner ring 10a and the outer ring 300a. Similarly, balls 11e are rolling elements disposed in the raceway at the other end side between the inner ring 10b and the outer ring 300a, and come into point contact with the inner ring 10b and the outer ring 300a. Consequently, the outer ring 300a can support the load from the inner rings 10a and 10b, in other words, the load from the rotation shaft 7, via the balls 11c and 11e. Moreover, as the balls 11c and 11e are in point contact with the inner rings 10a and 10b as well as the outer ring 300a, even if the rotation shaft 7 rotates at a high speed, the friction generated between the inner ring 10a and the outer ring 300a as well as between the inner ring 10b and the outer ring 300a is small. In this manner, the ball bearing unit 70 for the turbocharger can rotatably support the rotation shaft 7 while supporting the load from the rotation shaft 7.

In general, an angular bearing is selected for a ball bearing used for the ball bearing unit 70 for the turbocharger, to support the load from the rotation shaft 7 not only in the radial direction but also in the thrust direction.

Retainers 21 and 22 are members for respectively holding the balls 11c and the balls 11e at equal intervals. The retainer 21 is provided between the inner ring 10a and the outer ring 300a, and holds a plurality of balls 11c. The retainer 21 is a first machined retainer that holds the balls 11c disposed between the outer ring raceway surface at the one end side and the first inner ring raceway surface.

Similarly, the retainer 22 is provided between the inner ring 10b and the outer ring 300a, and holds a plurality of balls 11e. The retainer 22 is a second machined retainer that holds the balls 11e disposed between the outer ring raceway surface at the other end side and the second inner ring raceway surface.

For example, the type of the retainer 21 and the retainer 22 includes a machined (milled) retainer that is formed by milling a material such as steel and copper alloy, a punching (pressed) retainer that is formed by punching a member such as a steel plate with a die, a molded (resin) retainer that is formed by pouring resin into a mold, and the like. In the following, the machined retainer is considered for the retainer 21 and the retainer 22.

Figure 4:
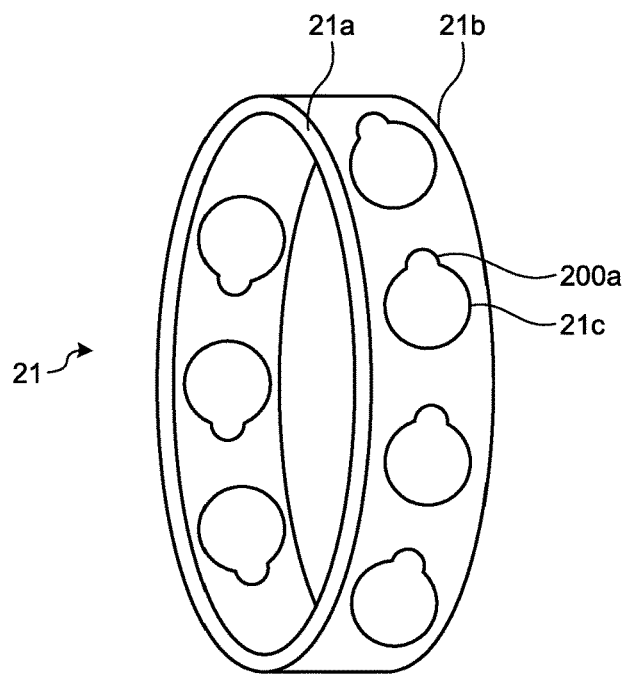
FIG. 4 is an explanatory diagram of a configuration of a retainer of the ball bearing unit for the turbocharger according to the embodiment.
Figure 5:
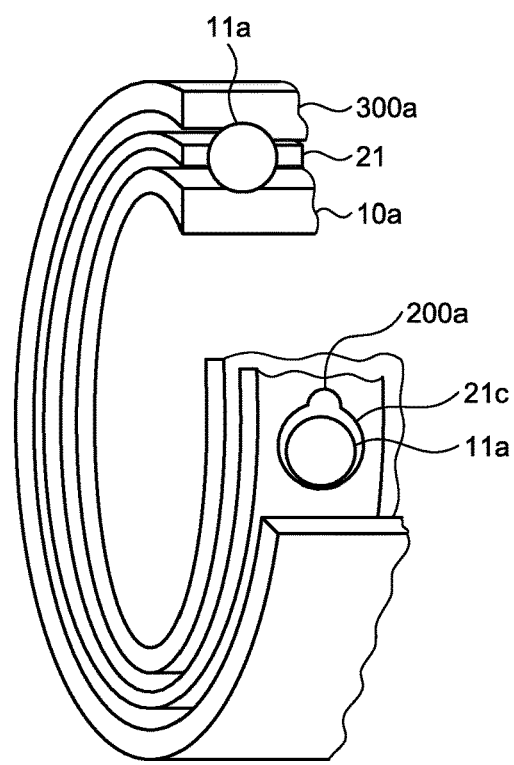
FIG. 5 is an explanatory diagram of a configuration of the retainer of the ball bearing unit for the turbocharger according to the embodiment.

FIG. 4 and FIG. 5 are explanatory diagrams of a configuration of a retainer of the ball bearing unit for the turbocharger according to the embodiment. FIG. 4 is an external view of a single retainer 21. FIG. 5 is an external view of the retainer 21 including components around the retainer 21.

FIG. 4 is an external view of the retainer 21 that is the machined retainer. The retainer 21 is an annular member that includes a plurality of pockets 21c formed in the circumferential direction thereof. Each pocket 21c has a circular shape to hold a ball 11a in a rollable manner. A groove 200a for holding lubricant is formed adjacent to each of the pockets 21c.

In FIG. 5, the external view of the retainer 21 is illustrated with the components around the retainer 21. In FIG. 5, the inner ring 10a indicates the inner ring 10a in FIG. 3, and the outer ring 300a indicates the outer ring 300a in FIG. 3 that is provided outside the inner ring 10a. The retainer 21 is an annular member provided between the inner ring 10a and the outer ring 300a, and includes the pockets 21c formed in the circumferential direction thereof that hold the balls 11a in a rollable manner. In this example, it is preferable that the diameter of the pocket 21c is equal to or more than 1.03 times and equal to or less than 1.07 times of the diameter of the ball 11a.

In FIG. 5, the retainer 21 rotates counterclockwise. When the retainer 21 is rotated counterclockwise, the ball 11a approaches the rear of the pocket 21c (in other words, the inner peripheral surface of the pocket 21c at the side without the groove 200a). In the inner peripheral surface of the pocket 21c, the inner peripheral surface of an area which the ball 11a approaches in the circumferential direction during rotation, has a shape corresponding to the shape of the ball 11a. The groove 200a is formed on a part of the inner peripheral surface corresponding to an area other than the area which the ball 11a approaches during rotation.

In this example, the groove 200a is formed at the rotation direction side of the machined retainer 21 in relation to the center position of the pocket 21c. Moreover, the inner peripheral surface of the pocket 21c and the groove 200a are formed so as to be smoothly connected.

These points will now be described with reference to FIG. 6 to FIG. 11. The reason why it is preferable to set the diameter of the pocket 21c to equal to or more than 1.03 times and equal to or less than 1.07 times of the diameter of the ball 11a will now be described with reference to FIG. 6 to FIG. 9.

Figures 6, 7:
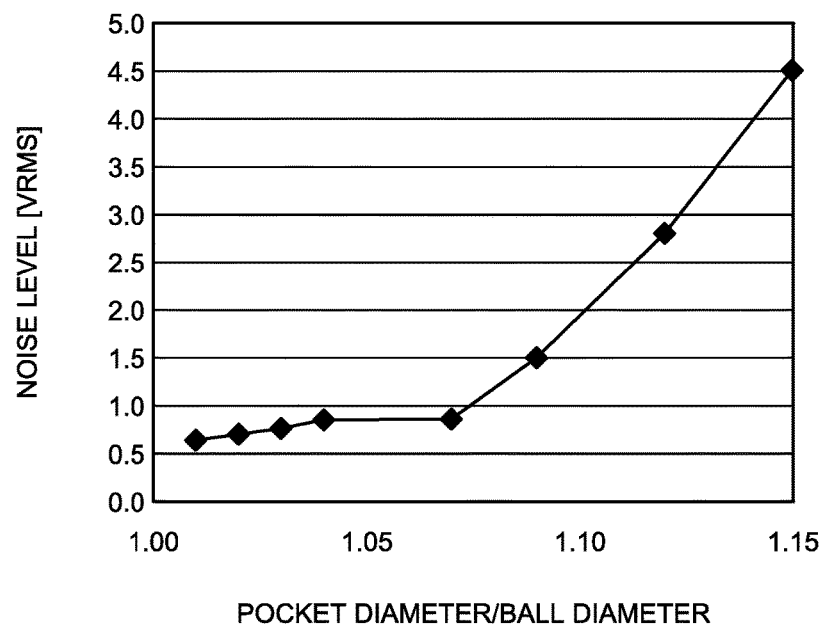
FIG. 6 is a table for explaining noise level of the ball bearing unit for the turbocharger according to the embodiment.
FIG. 7 is a graph for explaining the noise level of the ball bearing unit for the turbocharger according to the embodiment.

FIG. 6 and FIG. 7 are a table and a graph for explaining the noise level of the ball bearing unit for the turbocharger according to the embodiment. Values in the upper part of FIG. 6 are obtained by dividing the diameter of the pocket 21c by the diameter of the ball 11a (ball diameter). Values in the lower part of FIG. 6 are noise levels represented by the root mean square voltage (VRMS). FIG. 7 is a graph obtained by plotting the data in FIG. 6. As is evident from FIG. 6 and FIG. 7, the rattling noise is monotonously increased with the increase in the value of pocket diameter/ball diameter. In particular, when the diameter of the pocket 21c exceeds 1.07 times of the diameter of the ball 11a, the noise level is increased sharply. Thus, it is preferable that the diameter of the pocket 21c is equal to or less than 1.07 times of the diameter of the ball 11a.

The test conditions of FIG. 6 and FIG. 7 are as follows. A plurality of ball bearing units 70 for the turbocharger are prepared with the same ball diameter and each incorporated with the machined retainer 21 having different ratios of pocket diameter/ball diameter; i.e., different ratios of pocket diameters to ball diameters. The test is then performed on each of the ball bearing units 70 for the turbocharger. In the test, an output shaft of the motor is pressed into the ball bearing unit 70 for the turbocharger from one end side of the ball bearing unit 70, and a preload of 30 N is applied in the axial direction by providing a preload jig on the other end side of the ball bearing unit 70. A noise sensor manufactured in house is installed on the outer peripheral surface of the outer ring 300a, and the noise level is measured by recording the voltage value corresponding to the magnitude of noise during 10 seconds at 0.1 seconds interval, while keeping the rotation speed of 6800 rpm.

Figures 8, 9:
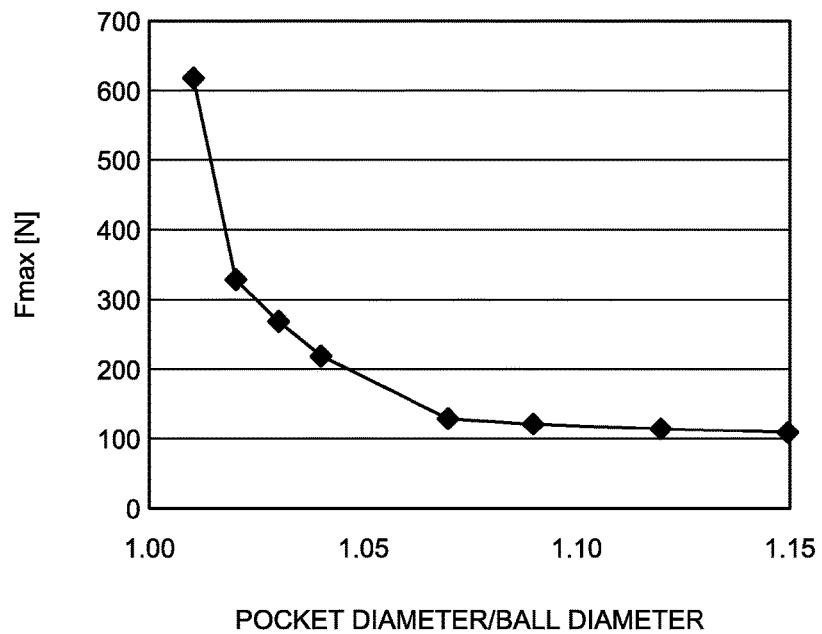
FIG. 8 is a table for explaining a contact load relating to the ball bearing unit for the turbocharger according to the embodiment.
FIG. 9 is a graph for explaining the contact load relating to the ball bearing unit for the turbocharger according to the embodiment.

FIG. 8 and FIG. 9 are a table and a graph for explaining a contact load according to the ball bearing unit for the turbocharger according to the embodiment. Values in the upper part of FIG. 8 are obtained by dividing the diameter of the pocket 21c by the diameter of the ball 11a (ball diameter). Values in the lower part of FIG. 8 are calculated values (N) of the maximum contact load applied to the pocket 21c, when the ball 11a is brought into contact with the pocket 21c. FIG. 9 is a graph obtained by plotting the data in FIG. 8. As is evident from FIG. 8 and FIG. 9, the maximum contact load is increased significantly, as the value of pocket diameter/ball diameter is closer to 1.00. When the diameter of the pocket 21c is below 1.03 times of the diameter of the ball 11a, the maximum contact load exceeds 300 N, and may damage the retainer. Thus, it is preferable that the diameter of the pocket 21c is equal to or more than 1.03 times of the diameter of the ball 11a.

The calculation conditions of FIG. 8 and FIG. 9 are as follows. It is assumed that the ball bearing units 70 for the turbocharger have the same ball diameter and are incorporated with the machined retainer 21 with different ratios of pocket diameter/ball diameter. The calculation is then performed on each of the ball bearing units 70 for the turbocharger. The calculation conditions are such that the rotation speed is 400,000 rpm, the load in the axial direction is 80 N, and the load in the radial direction is 130 N.

In this manner, when the ratio pocket diameter/ball diameter is too large, the ball 11a vibrates in the pocket 21c, thereby increasing the noise. On the other hand, when the ratio pocket diameter/ball diameter is too small, the maximum contact load is increased. Consequently, it is preferable to set the diameter of the pocket 21c to equal to or more than 1.03 times and equal to or less than 1.07 times of the diameter of the ball 11a, which is the rolling element.

Figure 10:
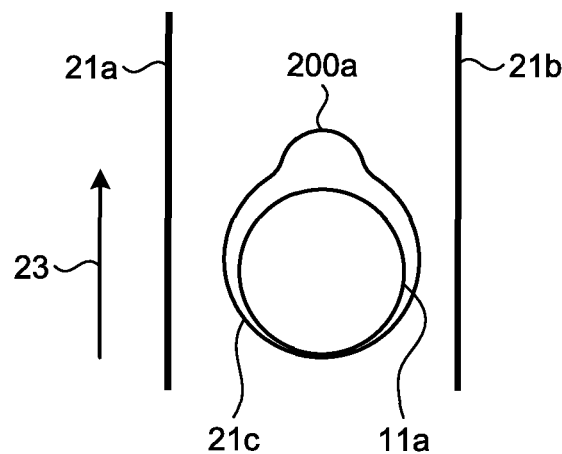
FIG. 10 is an explanatory diagram of a groove formed on an inner peripheral surface of a pocket of the retainer according to the embodiment.

Next, the role of the groove 200a formed on a part of the inner peripheral surface of the pocket 21c will be described. FIG. 10 is an explanatory diagram of the groove 200a formed on the inner peripheral surface of the pocket 21c of the retainer 21 according to the embodiment. In FIG. 10, an inner peripheral surface 21a of a retainer and an outer peripheral surface 21b of the retainer are respectively the inner peripheral surface and the outer peripheral surface of the retainer 21. The pocket 21c is one of the pockets of the retainer 21, and the ball 11a is a rolling element held in the pocket 21c. An arrow 23 indicates the rotation direction of the retainer 21. In the embodiment, it is assumed that the ball bearing unit for the turbocharger is used. Thus, the retainer 21 only rotates in one direction with the rotation of the turbine 8 The rotation direction of the ball 11a is the rotation direction opposite from the rotation direction of the retainer 21.

In this example, the groove 200a is formed on a part of the inner peripheral surface of the pocket 21c along the radial direction of the retainer 21. More specifically, as illustrated in FIG. 10, the groove 200a is formed at the rotation direction side of the machined retainer 21 in relation to the center position of the pocket 21c. In other words, the groove 200a is formed on a part of the inner peripheral surface corresponding to an area other than the area which the ball 11a approaches in the circumferential direction when the retainer 21 is rotated. As illustrated in FIG. 10, when the retainer 21 is rotated, the ball 11a is pressed against the inner peripheral surface portion at the side opposite from the rotation direction side of the machined retainer 21 relative to the center position of the pocket 21c, in the pocket 21c. Thus, the ball 11a approaches the pocket 21c at the inner peripheral surface portion (contact portion during the rotation). When the groove 200a for holding lubricant is provided at the rotation direction side of the retainer 21 along the radial direction of the retainer 21, in other words, at the side opposite from the contact portion during the rotation in the circumferential direction (in other words, the upper side of the pocket 21c in FIG. 10), the lubricant can easily enter the pocket. Consequently, it is possible to improve the lubrication characteristics. In addition, because the lubrication characteristics are improved, the life of the ball bearing unit 70 for the turbocharger will also be increased.

If the connection portion between the pocket 21c and the groove 200a is not smooth, the ball 11a comes into contact with the connection portion between the pocket 21c and the groove 200a, when the retainer 21 is rotated. This may result in damaging the retainer 21. Consequently, it is preferable to form the inner peripheral surface of the pocket 21c and the groove 200a so as to be smoothly connected, using a curved line and a circular arc.

In this manner, the ball bearing unit for the turbocharger according to the embodiment can reduce the rattling noise without deteriorating the lubricant characteristics.

Figure 11:
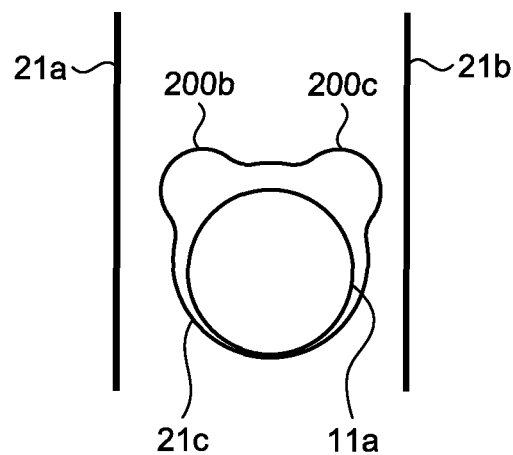
FIG. 11 is an explanatory diagram of another example of the groove formed on the inner peripheral surface of the pocket of the retainer according to the embodiment.

The embodiment is not limited to the above-described examples. For example, the shape of the groove 200a is not limited to the circular arc shape as illustrated in FIG. 10, and may also be a part of an oval, a curve such as parabola and hyperbola, or a rectangular shape. The groove to be formed is not limited to one, and for example, as illustrated in FIG. 11, two grooves of a groove 200b and a groove 200c may be formed. Moreover, in the embodiment, the machined retainer in which the ratio of pocket diameter/ball diameter is equal to or more than 1.03 and equal to or less than 1.07 may be used for both the retainer 21 and the retainer 22, or one of the retainer 21 and the retainer 22.

According to one mode of the present invention, it is possible to reduce the rattling noise without deteriorating the lubricant characteristics.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ball bearing unit for a turbocharger, the ball bearing unit comprising:
    an outer ring that has a cylindrical shape, and that has an inner peripheral surface provided with an outer ring raceway surface at one end side and an outer ring raceway surface at another end side formed separately from each other in an axial direction;
    a first inner ring that has a first inner ring raceway surface facing the outer ring raceway surface at the one end side;
    a second inner ring that has a second inner ring raceway surface facing the outer ring raceway surface at the another end side;
    a first machined retainer that holds a plurality of balls disposed between the outer ring raceway surface at the one end side and the first inner ring raceway surface; and
    a second machined retainer that holds a plurality of balls disposed between the outer ring raceway surface at the another end side and the second inner ring raceway surface,
    wherein the first machined retainer and the second machined retainer only rotates in one direction with the rotation of a turbine of the turbocharger,
    at least one of the first machined retainer and the second machined retainer includes a plurality of pockets that hold the plurality of balls in a rollable manner in a circumferential direction, and each of the plurality of pockets has a diameter equal to or more than 1.03 times and equal to or less than 1.07 times of a diameter of a ball in the plurality of balls,
    a groove is formed in an inner peripheral surface of a pocket included in the at least one of the first machined retainer and the second machined retainer, on a part of the inner peripheral surface located at a rotation direction side of the corresponding machined retainer in relation to a center position of the pocket, and is not formed at a side opposite from the rotation direction side of the corresponding machined retainer in relation to the center position of the pocket.

2. The ball bearing unit for a turbocharger according to claim 1, wherein the groove is formed along a radial direction of the corresponding machined retainer.

3. The ball bearing unit for a turbocharger according to claim 1, wherein the inner peripheral surface of the pocket and the groove are formed so as to be smoothly connected.

4. The ball bearing unit for a turbocharger according to claim 1, wherein two grooves are formed at the rotation direction side.

\* \* \* \* \*